US005612163A

United States Patent [19]

Teramoto et al.

[11] Patent Number: 5,612,163

[45] Date of Patent: Mar. 18, 1997

[54] TRANSFER SHEET OF POLYCARBONATE-BASED RESIN

[75] Inventors: Yoshikichi Teramoto, Inashiki-gun; Tooru Misawa, Iwaki; Satoru Matsunaga, Ishioka, all of Japan

[73] Assignee: Kureha Kagaku Kogyo Kabushiki Kaisha, Tokyo, Japan

[21] Appl. No.: 628,311

[22] Filed: Apr. 5, 1996

Related U.S. Application Data

[63] Continuation-in-part of Ser. No. 320,193, Oct. 7, 1994, abandoned.

[30] Foreign Application Priority Data

Oct. 12, 1993 [JP] Japan .................................... 5-279101
Mar. 25, 1994 [JP] Japan .................................... 6-79958

[51] Int. Cl.$^6$ .......................... C08L 69/00; C08G 64/10; G03G 7/00

[52] U.S. Cl. .......................... 430/126; 428/220; 525/470; 528/202

[58] Field of Search ............................ 430/126; 355/271, 355/272, 273; 428/220; 525/470; 528/202

[56] References Cited

U.S. PATENT DOCUMENTS

| | | | |
|---|---|---|---|
| 3,062,781 | 11/1962 | Bottenbruch . | |
| 3,334,154 | 8/1967 | Kim | 525/470 |
| 4,140,730 | 2/1979 | Binsack | 525/470 |
| 4,352,847 | 10/1982 | Okiyama | 428/141 |
| 4,818,254 | 4/1989 | Anand | 528/202 |
| 4,987,050 | 1/1991 | Shinozaki | 430/269 |
| 5,081,218 | 1/1992 | Marks | 528/202 |

FOREIGN PATENT DOCUMENTS

| | | |
|---|---|---|
| 0302447A1 | 2/1989 | European Pat. Off. . |
| 0359366A2 | 3/1990 | European Pat. Off. . |
| 0424800A2 | 5/1991 | European Pat. Off. . |
| 0506109A1 | 9/1992 | European Pat. Off. . |
| 2226543A | 1/1973 | Germany . |
| 3202477A1 | 8/1982 | Germany . |
| 55-4338 | 1/1980 | Japan . |
| 56-25953 | 3/1981 | Japan . |
| 5-301976 | 11/1993 | Japan . |
| 6-220222 | 8/1994 | Japan . |

*Primary Examiner*—David Buttner
*Attorney, Agent, or Firm*—David G. Conlin; Peter F. Corless

[57] ABSTRACT

A transfer sheet for printing media of electrophotographic copying machines or printers comprises a polycarbonate-based resin or a composition containing not less than 75% by mass of a polycarbonate-based resin, and having characteristics that:

the ratio of infrared absorbance at the wave number of 155 $mm^{-1}$ to that at 160 $mm^{-1}$ of said sheet is 0.3 to 0.6;

the melt viscosity at the shear rate of 200/sec at 280° C. of said sheet is not less than 2,000 Pa·s; and the thickness of said sheet is 130 to 250 μm.

16 Claims, No Drawings

TRANSFER SHEET OF POLYCARBONATE-BASED RESIN

CROSS-REFERENCE TO RELATED APPLICATION

This application is a continuation-in-part of application Ser. No. 08/320,193, filed on Oct. 7, 1994, now abandoned.

BACKGROUND OF THE INVENTION

The present invention relates to a transfer sheet comprising a polycarbonate-based resin for printing media of electrophotographic copying machines or printers.

The transfer sheet has the function of transferring the image formed on a photosensitive drum and as occasion demands, the functions of transferring and releasing a copying paper, and usually has a drum- or belt-like shape. This transfer sheet is required to meet various and high-level property requirements such as excellent electrical and mechanical properties and high flame retardancy. Regarding the electrical properties of the transfer sheet, the charging and discharging characteristics are of much account for attaching of the copying paper on the transfer sheet, smooth carriage of the copying paper and transfer of the toner.

In use with certain kinds of copying machine, the transfer sheet is required to have excellent creep properties and fatigue fracture resistance, since the transfer sheet is mechanically deformed when releasing the copying paper. In use with another type of copying machine, the transfer sheet is required to have durability against repetitive bending since the transfer sheet is turned in a belt-like state when passed between the rolls. Such mechanical durability needs to be high enough to stand several tens of thousand times of copying.

The transfer sheet must be replaced with new one when the copy image quality has dropped due to fatigue deformation of the sheet. It is preferable that the transfer sheet be transparent because when the sheet is changed, the new one can be readily set at the accurate position and the workability is bettered. Thus, the transfer sheet is required to have a parallel ray transmittance of not less than 60%, preferably not less than 80%. Also, since the transfer sheet is a part of an electromechanical part, its flame retardancy is made much account of and the transfer sheet is required to meet the requirements of not less than V-2 level of UL (Underwriters Laboratories Inc.) Standards No. 94.

Further, there is a conflict that when it is tried to satisfy one property requirements, it is found difficult to meet other requirements. For example, when it is attempted to satisfy the requirement for flame retardancy, it is become to deteriorate the mechanical durability (fatigue strength) and the transparency. Also, when reducing a sheet thickness, the transparency becomes favorable, but the flame retardancy becomes deteriorated.

Japanese Patent Publication (KOKOKU) No. 56-25953 suggests that compositions comprising brominated polycarbonate oligomers and high-molecular weight halogenated aromatic polycarbonates are flame-retardant. Also, Japanese Patent Publication (KOKOKU) No. 55-4338 describes that the content of a brominated polycarbonate oligomer necessary for making a polycarbonate flame-retardant so as to satisfy V-1 level of UL Standards No. 94 is not less than 3% by mass.

These related arts, however, merely disclose techniques for improving flame retardancy. No suggestion nor motivation is made of applicability of the disclosed compositions to the transfer sheets, and there is no description concerning compositions of meeting the required levels of mechanical durability, transparency and flame retardancy at the same time.

Also, since brominated polycarbonate sheets are lower in fatigue strength and more liable to stress cracking than non-brominated polycarbonate sheets, mere disclosure concerning the resin compositions comprising brominated polycarbonates and brominated polycarbonate oligomers, gives no substantial hint at realizing a transfer sheet having an excellent mechanical durability (fatigue strength), a high transparency and an excellent flame retardancy.

There is a strong demand to provide a transfer sheet having excellent mechanical durability, transparency and flame retardancy, more specifically, a high fatigue fracture resistance that enables transfer of tens of thousand times of printing media, a high transparency that allows easy exchange of transfer sheet, and a flame retardancy of the not less than V-2 level of UL Standards No. 94.

As a result of the present inventors intensive studies for satisfying the above request, it has been found that by extrusion-molding a resin or a composition comprising not less than 75% by mass of a polycarbonate-based resin, the obtained sheet having characteristics that the ratio of infrared absorbance at the wave number of 155 $mm^{-1}$ to that at 160 $mm^{-1}$ is 0.3 to 0.6, that the melt viscosity at the shear rate of 200/sec at 280° C. is not less than 2,000 Pa·s and that the thickness is 130 to 250 μm, possesses not less than $4\times10^4$ times of roll pass in the mechanical durability test described below, shows a parallel ray transmittance of not less than 60%, can meet the flame retardancy requirements of not less than V-2 level of UL Standards No. 94, and such sheet is useful as a transfer sheet. The present invention has been attained on the basis of this finding.

SUMMARY OF THE INVENTION

It is an object of the present invention to provide a transfer material for electrophotography which can withstand deformation taking place when releasing the copying paper, has a fatigue fracture resistance that may take tens of thousand times of copies, has a high degree of transparency that allows easy change of transfer material when the copy image quality has lowered due to fatigue deformation, and can clear the flame retardancy standards of not less than V-2 level of UL Standards No. 94.

To achieve the aims, in a first aspect of the present invention, there is provided a transfer sheet for printing media of electrophotographic copying machines or printers, comprising a polycarbonate-based resin or a composition containing 75 to 100% by mass of a polycarbonate-based resin and 0 to 25% by mass of a brominated polycarbonate oligomer composed of structural units represented by the formula (I):

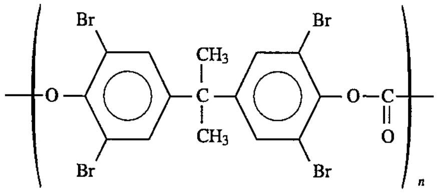

(I)

wherein the number of the structural units is 2 to 30, and the total degree of the oligomerization is not more than 30, and having characteristics that:

the ratio of infrared absorbance at the wave number of 155 $mm^{-1}$ to that at 160 $mm^{-1}$ of said sheet is 0.3 to 0.6;

the melt viscosity at the shear rate of 200/sec at 280° C. of said sheet is not less than 2,000 Pa·s; and the thickness of said sheet is 130 to 250 μm.

In a second aspect of the present invention, there is provided a transfer sheet for printing media of electrophotographic copying machines or printers, consisting essentially of a polycarbonate-based resin, and having characteristics that:

the ratio of infrared absorbance at the wave number of 155 $mm^{-1}$ to that at 160 $mm^{-1}$ of said sheet is 0.3 to 0.6;

the melt viscosity at the shear rate of 200/sec at 280° C. of said sheet is not less than 2,000 Pa·s; and the thickness of said sheet is 130 to 250 μm.

In a third aspect of the present invention, there is provided a transfer sheet for printing media of electrophotographic copying machines or printers, comprising not less than 75% by mass to less than 100% by mass of a polycarbonate-based resin and not more than 25% by mass to more than 0% by mass of a brominated polycarbonate oligomer composed of structural units represented by the formula (I):

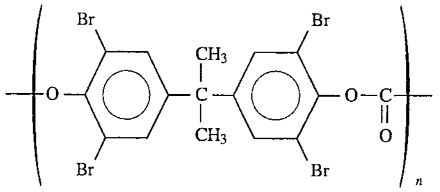

(I)

wherein the number of the structural units is 2 to 30, and the total degree of the oligomerization is not more than 30, and having characteristics that:

the ratio of infrared absorbance at the wave number of 155 $mm^{-1}$ to that at 160 $mm^{-1}$ of said sheet is 0.3 to 0.6;

the melt viscosity at the shear rate of 200/sec at 280° C. of said sheet is not less than 2,000 Pa·s; and the thickness of said sheet is 130 to 250 μm.

In a fourth aspect of the present invention, there is provided a method for transferring an image of an electrophotographic copying machine or printer, comprising:

transferring an image to a transfer sheet of the electrophotographic copying machine or printer, the transfer sheet comprising a polycarbonate-based resin or a composition containing not less than 75% by mass of a polycarbonate-based resin, and having characteristics that:

the ratio of infrared absorbance at the wave number of 155 $mm^{-1}$ to that at 160 $mm^{-1}$ of said sheet is 0.3 to 0.6;

the melt viscosity at the shear rate of 200/sec at 280° C. of said sheet is not less than 2,000 Pa·s; and the thickness of said sheet is 130 to 250 μm.

In a fifth aspect of the present invention, there is provided an electrophotographic copy machine that comprises a transfer sheet for printing media of electrophotographic copying machines or printers, comprising a polycarbonate-based resin or a composition containing 75 to 100% by mass of a polycarbonate-based resin and 0 to 25% by mass of a brominated polycarbonate oligomer composed of structural units represented by the formula (I):

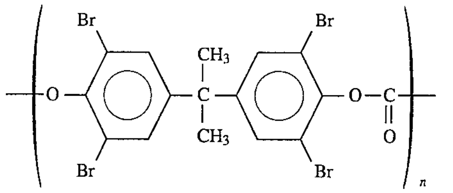

(I)

wherein the number of the structural units is 2 to 30, and the total degree of the oligomerization is not more than 30, and having characteristics that:

the ratio of infrared absorbance at the wave number of 155 $mm^{-1}$ to that at 160 $mm^{-1}$ of said sheet is 0.3 to 0.6;

the melt viscosity at the shear rate of 200/sec at 280° C. of said sheet is not less than 2,000 Pa·s; and the thickness of said sheet is 130 to 250 μm. In a sixth aspect of the present invention, there is provided a printer that comprises a transfer sheet for printing media of electrophotographic copying machines or printers, comprising a polycarbonate-based resin or a composition containing 75 to 100% by mass of a polycarbonate-based resin and 0 to 25% by mass of a brominated polycarbonate oligomer composed of structural units represented by the formula (I):

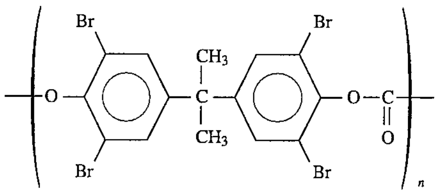

(I)

wherein the number of the structural units is 2 to 30, and the total degree of the oligomerization is not more than 30, and having characteristics that:

the ratio of infrared absorbance at the wave number of 155 $mm^{-1}$ to that at 160 $mm^{-1}$ of said sheet is 0.3 to 0.6;

the melt viscosity at the shear rate of 200/sec at 280° C. of said sheet is not less than 2,000 Pa·s; and the thickness of said sheet is 130 to 250 μm.

DETAILED DESCRIPTION OF THE INVENTION

The transfer sheet according to the present invention comprises a resin or a composition comprising not less than 75% by mass of a polycarbonate-based resin.

The transfer sheet of the present invention has a characteristic that the ratio of infrared absorbance at the wave number of 155 $mm^{-1}$ to that at 160 $mm^{-1}$ is 0.3 to 0.6, preferably 0.35 to 0.55. The ratio of infrared absorbance at the wave number of 155 $mm^{-1}$ to that at 160 $mm^{-1}$ is hereinafter referred to simply as "absorbance ratio". When this absorbance ratio is less than 0.3, the transfer sheet is unsatisfactory in flame retardancy, and when the absorbance ratio exceeds 0.6, the mechanical durability of the transfer sheet deteriorates. This absorbance ratio is an index of the content of bromine atoms in the sheet.

The absorbance ratio was determined in the following method. A pelletized or sheet-like polycarbonate-based resin was press-molded at 260° C. to form an approximately 80 μm thick sheet, and an infrared spectrophotometer FTIR-1710 (manufactured by Perkin-Elmer Co., Ltd.), the absorptions at the wave numbers of 155 $mm^{-1}$ and 160 $mm^{-1}$ on the spectrum were measured according to the transmission method and the absorbances (D) at the said wavelengths were determined by the ordinary method, and therefrom the absorbance ratio (D at 155 $mm^{-1}$/D at 160 $mm^{-1}$) was determined.

The transfer sheet according to the present invention has further characteristic that the melt viscosity at the shear rate of 200/sec at 280° C. is not less than 2,000 Pa·s. Where the term "melt viscosity" is used in the present invention, it means melt viscosity at the shear rate of 200/sec at 280° C. When the melt viscosity is less than 2,000 Pa·s, the transfer sheet lacks required mechanical durability. The melt viscosity shown in the present invention are those determined by using Capillograph (manufactured by Toyo Seiki Co., Ltd.). The upper limit of the melt viscosity of the transfer sheet is not specifically defined as far as the transfer sheet is moldable, but when the melt viscosity exceeds 4,000 Pa·s, the moldability of the transfer sheet tends to deteriorate, making it difficult to carry out extrusion molding. Preferably the melt viscosity of the transfer sheet is below 3,500 Pa·s. Thus, a transfer sheet whose melt viscosity at the shear rate of 200/sec at 280° C. is not less than 2,000 Pa·s, preferably 2,100 to 4,000 Pa·s, more preferably 2,200 to 3,500 Pa·s.

The transfer sheet of the present invention may comprise either a polycarbonate-based resin or a composition containing not less than 75% by mass of a polycarbonate-based resin. For providing the above-specified range of absorbance ratio, the polycarbonate-based resin itself may be brominated. In case where the sheet consists essentially of the polycarbonate-based resin, it is required to use the brominated polycarbonate-based resin. On the other hand, in case where the sheet comprising the polycarbonate-based resin and the brominated polycarbonate oligomer, the polycarbonate-based resin which may be brominated is used.

The bromine atom in the brominated polycarbonate-based resin exists in the form of tetrabromobisphenol A. That is to say, the brominated polycarbonate-based resin is a copolymer having the recurring structural units represented by the following formula (I):

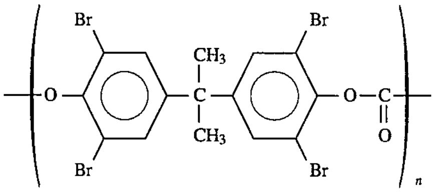

(I)

Such brominated polycarbonates are obtained, for example, by polycondensation of phosgene, bisphenol A and tetrabromobisphenol A as disclosed in U.S. Pat. No. 3,855,277. The brominated polycarbonates are commercially available, the typical examples thereof, being Novarex 7030NB (produced by Mitsubishi Kasei Corp.), and Panlite KN-1300 (produced by Teijin Kasei Corp).

In the present invention, a brominated polycarbonate oligomer may be added to the polycarbonate-based resin. The brominated polycarbonate oligomers used in the present invention are preferably usable those having a melt viscosity at the shear rate of 200/sec at 280° C. is 50 to 1,000 Pa·s, more preferably 60 to 600 Pa·s.

The brominated polycarbonate oligomer used in the present invention is preferably of a single structural oligomer having the structural units represented by the formula (I) or a copolymeric oligomer having the structural units represented by the formula (I):

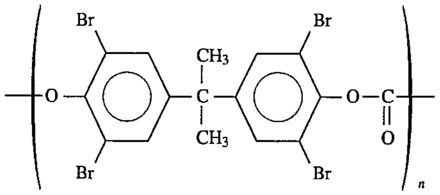

(I)

wherein the number of the structural units is 2 to 30, preferably 2 to 15, more preferably 2 to 10, and the total degree of the oligomerization is not more than 30.

The "single structural oligomer" referred to in the present invention is an oligomer having 2 to 30 of structural units represented by the formula (I) , preferably 2 to 15 of structural units represented by the formula (I), more preferably 2 to 10 of structural units represented by the formula (I).

The "copolymeric oligomer" referred to in the present invention is an oligomer having 2 to 30 of structural units represented by the formula (I), preferably 2 to 15 of structural units represented by the formula (I), more preferably 2 to 10 of structural units represented by the formula (I) based on one oligomer molecule. The total degree of the oligomerization thereof is not more than 30.

As the structural units other than those of the formula (I), which are usable for the copolymeric oligomers in the present invention, structural units constituting the polycarbonates or copolycarbonates can be cited.

Such brominated polycarbonate oligomer is obtained, for example, by reacting a carbonate precursor with a mixture of the brominated dihydric phenol and a chain stopper as disclosed in U.S. Pat. No. 3,855,277. As a carbonate precursor, carbonyl bromide and phosgene may be exemplified.

The brominated polycarbonate oligomers are commercially available, as for example Fireguard 7000 and Fireguard 7500 (produced by Teijin Kasei Corp.) and BC-52 (produced by Great Lakes Chemical Co., Ltd).

In the transfer sheet of the present invention, the content of the polycarbonate-based resin is not less than 75% by mass, preferably not less than 90% by mass, more preferably 100% by mass (which means that the sheet comprises a polycarbonate-based resin alone), and the content of the brominated polycarbonate oligomer is not more than 25% by mass, preferably not more than 10% by mass, more preferably 0% by mass (which means that no brominated polycarbonate oligomer is incorporated).

The bromine content of the transfer sheet of the present invention is defined by the ratio of infrared absorbance at the wave number of 155 $mm^{-1}$ to that at 160 $mm^{-1}$ of 0.3 to 0.6. Such ratio of infrared absorbance at the wave number of 155 $mm^{-1}$ to that at 160 $mm^{-1}$ of 0.3 to 0.6 is equivalent to a molar ratio of the structural units (tetrabromobisphenol A residue group) represented by the formula (I) of about 10 to about 30 mol %. The molar ratio of about 15 to about 25 mol % is preferred.

In the present invention, it is possible to contain proper additives for the subject matter of the present invention. For example, there may be contained not more than 25% by mass of a graft copolymer comprising a rubber backbone polymer and a branched polymer comprising at least one of acrylic alkyl esters and methacrylic alkyl esters as a structural unit.

Other additives usable in the present invention include inorganic compounds such as calcium sulfate, silica, asbestos, talc, clay, mica and powdered quartz; antioxidants such as hindered phenol-type antioxidants, phosphorus-type antioxidants (phosphorous ester-type antioxidants and phosphoric ester-type antioxidants) and amine-type antioxidants; ultraviolet absorbers such as benzotriazole-type UV absorbers and benzophenone-type UV absorbers; external lubricants such as aliphatic carboxylic acid ester-type lubricants and paraffin-type lubricants; and antistatic agents.

The process for producing the sheet of the present invention is not specified; the sheet can be produced according to a conventional process which comprises premixing (if necessary) the starting materials and subjecting the resultant mixture to melt-kneading and molding. For instance, the pelletized materials are melt-kneaded and then extrusion-molded into a sheet by an extrusion molding machine. For extrusion molding, there can be used, for example, a uniaxial-screw extruder provided with a T-die. The molding temperature is usually around 270° to 300° C.

The thickness of the transfer sheet according to the present invention is 130 to 250 μm, preferably 135 to 200 μm, more preferably 140 to 170 μm. When the thickness is less than 130 μm, the transfer sheet proves unsatisfactory in flame retardancy, and when the thickness is more than 250 μm, the transfer sheet rigidity becomes too high, making it hard to bend the transfer sheet when attached to a machine or in other use.

The transfer sheet of the present invention has characteristics that the number of times in which the sheet can pass the roll without break in the mechanical durability test described below is not less than $4\times10^4$, preferably not less than $5\times10^4$; the flame retardancy of the sheet is such that it can meet the requirements of not less than V-2 level of UL Standards No. 94; and the parallel ray transmittance is not less than 60%, preferably not less than 80%.

Mechanical Durability Test

Each test sheet was cut into a strip of 10 mm in .width and 110 mm in length. This strip-shaped sheet, with a load of 29.4N applied to both ends in the longitudinal direction thereof, was reciprocated on a freely rotatable roll and the number of times that the sheet could pass the roll without break (equivalent to twice the number of reciprocation) was counted. The sheet amplitude was 25 mm and each sheet specimen was reciprocated at a rate of 140 times/rain (corresponding to the average speed of 7 m/min).

The transfer sheet of the present invention has a fatigue fracture resistance that allows tens of thousands of times of transfer of a printing medium, a transparency that can facilitate exchange of transfer sheet and a flame retardancy that meets the requirements of not less than V-2 level of UL Standards No. 94, and thus can ideally serve as a transfer material for the printing media in electrophotography or printing.

EXAMPLES

The following examples further illustrate the present invention. It is to be understood, however, that these examples are merely intended to be illustrative and not to be construed as limiting the scope of the invention in any way.

Evaluation of compositions in Examples and Comparative Examples was carried out the following manner.

Mechanical Durability

Each test sheet was cut into a strip of 10 mm in width and 110 mm in length. This strip-shaped sheet, with a load of 29.4N applied to both ends in the longitudinal direction thereof, was reciprocated on a freely rotatable roll and the number of times that the sheet could pass the roll without break (equivalent to twice the number of reciprocation) was counted. The sheet amplitude was 25 mm and each sheet specimen was reciprocated at a rate of 140 times/min (corresponding to the average speed of 7 m/min). The indicated value for each sheet is the average of the measurements on five specimens. This evaluation method is an accelerated test of fatigue fracture of transfer sheets commonly used in the art.

Break strength

Measured according to ASTM D-882 in the machine direction.

Tear strength

Measured according to JIS K-7128-B.

Flame retardancy

Measured according to UL 94-V.

Transparency

Parallel ray transmittance was measured according to JIS K-7105.

Example 1

87% by mass of a brominated polycarbonate resin partly having the structural units of the formula (I) (Panlite KN-1300 produced by Teijin Kasei Corp.; melt viscosity: 3,010 Pa·s; absorbance ratio: 0.07) and 13% by mass of a brominated polycarbonate oligomer of the formula (I) (Fireguard FG7000 produced by Teijin Kasei Corp., melt viscosity: 260 Pa·s, the number of the structural units represented by the formula (I) based on one oligomer molecule: 6) were blended and pelletized by a twin-screw extruder. The obtained pellets were dried at 120° C. for 6 hours and then molded into a 150 μm-thick sheet by using a uniaxial screw extruder provided with a T-die. The absorbance ratio of the obtained sheet was 0.31. The absorbance ratio mentioned here and hereinafter was measured in the afore-described manner for a 80 μm thick sheet.

This sheet was cut to a size of 400 mm in width and 630 mm in length and then shaped into a drum-like form to obtain a transfer sheet, and its electrostatic properties were evaluated. When a DC voltage of +3.5 kV was applied to the sheet by using brush-like electrodes, the surface potential of the sheet produced was 1,800 V and the sheet could easily draw paper to itself. Then, when the sheet was destaticized by applying −700 V, its surface potential dropped to 0 V and paper could be easily separated. The properties of the sheet are shown in Table 1.

TABLE 1

| | Properties of brominated polycarbonates | | Properties of oligomers | Composition | |
|---|---|---|---|---|---|
| | Absorbance ratio | Melt viscosity Pa · s | Melt viscosity Pa · s | Polycarbonate mass % | Oligomer mass % |
| Examples | | | | | |
| 1 | 0.07 | 3010 | 260 | 87 | 13 |
| 2 | 0.07 | 3010 | 260 | 80 | 20 |
| 3 | 0.30 | 2770 | 260 | 91 | 9 |
| 4 | 0.30 | 2770 | 60 | 91 | 9 |
| 5 | 0.30 | 2770 | — | 100 | 0 |
| Comparative Examples | | | | | |
| 1 | 0.07 | 3010 | — | 100 | 0 |
| 2 | 0.43 | 1630 | — | 100 | 0 |

TABLE 1-continued

| | | | | | |
|---|---|---|---|---|---|
| 3 | 0.07 | 3010 | 260 | 97 | 3 |
| 4 | 0.07 | 3010 | 260 | 74 | 26 |
| 5 | 0.08 | 1000 | 260 | 87 | 13 |

| | Properties of sheet | | | | |
|---|---|---|---|---|---|
| | Absorbance ratio | Melt viscosity Pa · s | Mechanical durability Number of times of pass | Tensile strength MPa | Tensile elongation at break % |
| Examples | | | | | |
| 1 | 0.31 | 2360 | 88000 | 97 | 200 |
| 2 | 0.8 | 2140 | 68000 | 96 | 180 |
| 3 | 0.44 | 2070 | 82000 | 97 | 220 |
| 4 | 0.46 | 2050 | 60000 | 92 | 180 |
| 5 | 0.30 | 2230 | 99800 | 64 | 120 |
| Comparative Examples | | | | | |
| 1 | 0.07 | 2460 | 96000 | 98 | 200 |
| 2 | 0.43 | 1080 | 20000 | 80 | 110 |
| 3 | 0.12 | 2390 | 90000 | 98 | 200 |
| 4 | 0.64 | 1900 | 26000 | 65 | 100 |
| 5 | 0.30 | 850 | 20000 | 70 | 80 |

| | Properties of sheet | | |
|---|---|---|---|
| | Tear strength N/mm | Flame retardancy | Parallel ray transmittance % |
| Examples | | | |
| 1 | 12 | V-2 | 89 |
| 2 | 12 | V-2 | 87 |
| 3 | 12 | V-2 | 88 |
| 4 | 11 | V-2 | 88 |
| 5 | 13 | V-2 | 88 |
| Comparative Examples | | | |
| 1 | 13 | Out of standard | 90 |
| 2 | 9 | V-2 | 90 |
| 3 | 13 | Out of standard | 90 |
| 4 | 10 | V-2 | 86 |
| 5 | 9 | V-2 | 87 |

Example 2

The same procedure as Example 1 was carried out except that the amount of the brominated polycarbonate resin was reduced to 80% by mass while correspondingly increasing the amount of the brominated polycarbonate oligomer. The absorbance ratio of the obtained sheet was 0.48. The properties and the test results of this sheet are shown in Table 1.

Example 3

The same procedure as Example 1 was carried out except that 91% by mass of Novarex 7030NB (a brominated polycarbonate resin partly having the structural units of the formula (I) , produced by Mitsubishi Kasei Corp.; the melt viscosity: 2,770 Pa·s; the absorbance ratio: 0.30) was used in place of 87% by mass of Panlite KN-1300, with the corresponding change to 9% by mass of Fireguard FG7000. The absorbance ratio of the obtained sheet was 0.44. The properties and the test results of this sheet are shown in Table 1.

Example 4

The same procedure as Example 3 was carried out except for use of BC 52 (a brominated polycarbonate oligomer of the formula (I), produced by Great Lakes Chemical Co.) in place of Fireguard FG7000. The absorbance ratio of the obtained sheet was 0.46. The properties and the test results of the sheet are shown in Table 1.

Example 5

The same procedure as Example 3 was carried out except that Novarex 7030NB alone was used as starting material. The results are shown in Table 1.

Comparative Example 1

The same procedure as Example 1 was carried cut except that no brominated polycarbonate oligomer was used. The absorbance ratio of the obtained sheet was 0.07. The results are shown in Table 1.

Comparative Example 2

The same procedure as Example 1 was carried cut except that Toughlon NB 2500 of Idemitsu Petrochemical Corp.; the melt viscosity: 1,630 Pa·s; the absorbance ratio: 0.43) was used as brominated polycarbonate resin, and that no brominated polycarbonate oligomer was used. The absorbance ratio of the obtained sheet was 0.43. The results are shown in Table 1.

Comparative Examples 3 and 4

The same procedure as Example 1 was carried except that the amount of the brominated polycarbonate resin was changed to 97% by mass and 74% by mass, respectively, while; correspondingly changing the amount of the brominated polycarbonate oligomer. The absorbance ratios of the obtained sheets were 0.12 and 0.64, respectively. The results are shown in Table 1.

Comparative Example 5

The same procedure as Example 1 was followed except that Panlite LN-1250 (a brominated polycarbonate resin produced by Teijin Kasei Corp.; the melt viscosity: 1,000 Pa·s; the absorbance ratio: 0.08) was used in place of Panlite KN-1300. The absorbance ratio of the obtained sheet was 0.30. The results are shown in Table 1.

What is claimed is:

1. A method of transferring an image of an electrophotographic copying machine or printer, comprising:

transferring an image to a transfer sheet of the electrophotographic copying machine or printer, the transfer sheet comprising a brominated polycarbonate-based resin, or a composition comprising not less than 75 % by mass to less than 100% by mass of a polycarbonate-based resin or a brominated polycarbonate-based resin and not more than 25% by mass to more than 0% by mass of a brominated polycarbonate oligomer, and having characteristics that:

the ratio of infrared absorbance at the wave number of 155 $mm^{-1}$ to that at 160 $mm^{-1}$ of said sheet is 03 to 0.6;

the melt viscosity at the shear rate of 200/sec at 280° C. of said sheet is not less than 2,000 Pa·s; and the thickness of said sheet is 130 to 250 μm.

2. A method of claim 1 wherein the sheet consists essentially of a brominated polycarbonate-based resin.

3. A method of claim 1 wherein the oligomer is composed or structural units represented by the following formula I:

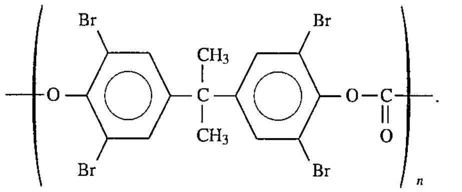

(I)

4. A method of claim 3 wherein the number of structural units of the oligomer is 2 to 30, and the total degree of oligomerization is not more than 30 .

5. A method of claim 3 wherein the melt viscosity at the shear rate of 200/sec at 280° C. of said brominated polycarbonate oligomer is 50 to 1,000 Pa·s.

6. A method of claim 3 wherein the melt viscosity at the shear rate of 200/sec at 280° C. of said brominated polycarbonate oligomer is 60 to 600 Pa·s.

7. A method of claim 3 wherein the brominated polycarbonate oligomer is composed of structural units represented by the formula (I):

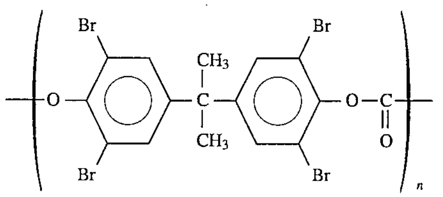

(I)

wherein the number of structural units is 2 to 15.

8. A method of claim 3 wherein the brominated polycarbonate oligomer is composed of structural units represented by the formula (I):

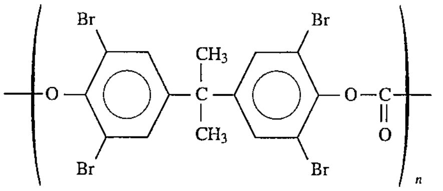

(I)

wherein the number of structural units is 2 to 10.

9. A method of claim 1 wherein the thickness of said sheet is 135 to 200 μm.

10. A method of claim 1 wherein the thickness of said sheet is 140 to 170 μm.

11. A method of claim 1 wherein the transfer sheet has characteristics the flame retardancy of the sheet is such that it can meet the requirements of not less than V-2 level in UL Standards No. 94, that the parallel ray transmittance of the sheet is not less than 60%, and that the number of times the sheet can pass a freely rotatable roll without break in the following mechanical durability test is not less than $4\times10^4$:

a 10 mm wide and 110 mm long strip of the transfer sheet is cut and a 29.4N load is applied to both ends of the transfer sheet strip in longitudinal direction thereof and the transfer strip is reciprocated on the freely rotatable roll a an average speed of 7 m/minutes with a transfer sheet amplitude of 25 mm.

12. A method of claim 1 wherein the melt viscosity at the shear rate of 200/sec at 280° C. of said sheet is 2,100 to 4,000 Pa·s.

13. A method of claim 1 wherein the melt viscosity at the shear rate of 200/sec at 280° C. of said sheet is 2,200 to 3,500 Pa·s.

14. A method of claim 1 wherein the brominated polycarbonate-based resin is a copolymer having the structural units represented by the formula (I):

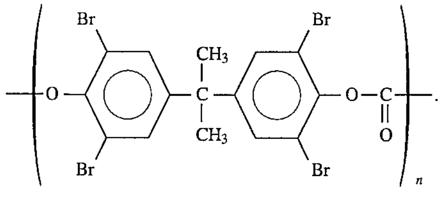

(I)

15. An electrophotographic copy machine that comprises a transfer sheet for printing media of an electrophotographic copy machine, the transfer sheet comprising a brominated polycarbonate-based resin, or a composition comprising not less than 75% by mass to less than 100% by mass of a polycarbonate-based resin or a brominated polycarbonate-based resin and not more than 25% by mass to more than 0% by mass of a brominated polycarbonate oligomer composed of structural units represented by the formula (I):

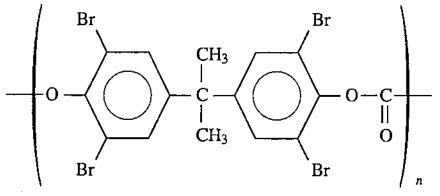

(I)

wherein the number of the structural units is 2 to 30, and the total degree of the oligomerization is not more than 30, and having characteristics that:

the ratio of infrared absorbance at the wave number of 1.55 $mm^{-1}$ to that at 160 $mm^{-1}$ of said sheet is 0.3 to 0.6;

the melt viscosity at the shear rate of 200/sec at 280° C. of said sheet is not less than 2,000 Pa·s; and the thickness of said sheet is 130 to 250 μm.

16. A printer that comprises a transfer sheet for printing media of a printer, the transfer sheet comprising a brominated polycarbonate-based resin, or a composition comprising not less than 75% by mass to less than 100% by mass of a polycarbonate-based resin or a brominated polycarbonate-based resin and not more than 25% by mass to more than 0% by mass of a brominated polycarbonate oligomer composed of structural units represented by the formula (I):

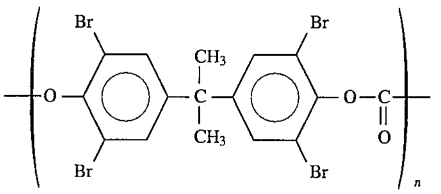

(I)

wherein the number of the structural units is 2 to 30, and the total degree of the oligomerization is not more than 30, and having characteristics that:

the ratio of infrared absorbance at the wave number of 155 $mm^{-1}$ to that at 160 $mm^{-1}$ of said sheet is 0.3 to 0.6;

the melt viscosity at the shear rate of 200/sec at 280° C. of said sheet is not less than 2,000 Pa·s; and the thickness of said sheet is 130 to 250 μm.

* * * * *